(12) United States Patent
Du et al.

(10) Patent No.: US 12,243,559 B1
(45) Date of Patent: Mar. 4, 2025

(54) HARD DISK DRIVE (HDD) WITH ACOUSTIC NOISE DETECTION

(71) Applicant: Marvell Asia Pte Ltd, Singapore (SG)

(72) Inventors: Ke Du, Fremont, CA (US); Matthew Kim, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/468,827

(22) Filed: Sep. 18, 2023

Related U.S. Application Data

(62) Division of application No. 17/500,800, filed on Oct. 13, 2021, now abandoned.

(60) Provisional application No. 63/091,269, filed on Oct. 13, 2020.

(51) Int. Cl.
*G11B 20/24* (2006.01)
*G11B 27/36* (2006.01)
*G11B 33/14* (2006.01)
*G11B 5/55* (2006.01)

(52) U.S. Cl.
CPC ............. *G11B 20/24* (2013.01); *G11B 27/36* (2013.01); *G11B 33/1413* (2013.01); *G11B 5/5586* (2013.01)

(58) Field of Classification Search
None
See application file for complete search history.

(56) References Cited

U.S. PATENT DOCUMENTS

| | | |
|---|---|---|
| 6,523,413 B1 | 2/2003 | Hoshino et al. |
| 11,348,599 B1 | 5/2022 | Gowda et al. |
| 2004/0034482 A1 | 2/2004 | Gross et al. |
| 2004/0034818 A1 | 2/2004 | Gross et al. |
| 2004/0205403 A1 | 10/2004 | Markow et al. |
| 2006/0212755 A1 | 9/2006 | Urmanov et al. |
| 2008/0019245 A1 | 1/2008 | Sutardja |
| 2008/0259563 A1 | 10/2008 | Fukuda et al. |
| 2009/0288491 A1 | 11/2009 | Suzuki et al. |
| 2019/0051323 A1 | 2/2019 | Wiegandt et al. |

*Primary Examiner* — Craig A. Renner

(57) ABSTRACT

A storage system including a plurality of HDDs, a cooling system, and a system controller is provided. Each of the plurality of HDDs includes a disk, a write head configured to write data to the disk, a microphone, an HDD controller configured to process a signal from the microphone determine noise detected by the microphone, and a housing that houses the disk, the write head, the microphone, and the HDD controller. The cooling system is configured to cool the plurality of the HDDs. The system controller is configured to receive data corresponding to the determined noise detected by the microphones of each of the plurality of HDD, and control a cooling level of the cooling system based on the received data and acoustic noise information associated with each of the plurality of HDDs. A method for operating the storage system is also provided.

20 Claims, 5 Drawing Sheets

HARD DISK DRIVE (HDD) WITH ACOUSTIC NOISE DETECTION

CROSS REFERENCE TO RELATED APPLICATION

This is a division of commonly-assigned U.S. patent application Ser. No. 17/500,800, filed Oct. 13, 2021, which claims the benefit of, and with commonly-assigned U.S. Provisional Patent Application No. 63/091,269, filed Oct. 13, 2020, each of which is hereby incorporated by reference herein in its respective entirety.

FIELD OF USE

This disclosure relates generally to real-time mitigation of the effects of acoustic noise on hard disk drives (HDDs). More particularly, this disclosure relates to the detection of acoustic noise by a microphone included in an HDD and mitigation of the effects of the detected acoustic noise in real-time using the detected acoustic noise.

BACKGROUND OF THE INVENTION

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

HDDs conventionally include one or more rotating hard drive platters, each having numerous data tracks for storing data. During read or write operations, one or more read/write actuator arms move relative to the rotating hard drive platters to read and/or write data to or from the data tracks. To increase the storage capacity of the hard drive platters, the width of the data tracks is continually decreasing. However, as the width of the data tracks decreases, HDDs become more sensitive to acoustic noise (e.g., generated by a cooling system). For example, if a read or write operation is being performed when an HDD is subject to acoustic noise that causes an offset between data tracks and a read/write head of the read/write actuator arms, errors in the read or write operation may occur.

In large-scale storage systems, cooling systems may be operated at a level that is below a threshold at which noise generated by the cooling system is expected to cause errors in reading and writing operations in HDDs of the storage system. U.S. Patent Publication No. 2019/0051323, entitled "ACOUSTIC MEASUREMENT SURROGATE FOR DISC DRIVE," which is hereby incorporated by reference in its entirety, describes a system for measuring acoustic noise to which an HDD in a storage system will be exposed. In the discussed system, an acoustic noise measurement device, which has a housing having a form factor that is the same as the form factor of HDDs in the storage system, is inserted into an HDD slot (e.g., of an HDD rack or cabinet) so as to determine the acoustic noise that an HDD will experience when inserted into the same slot. From the collected data, a report related to throughput performance is able to be generated to determine how physical features and/or control systems of the HDD may be modified to better accept and/or withstand acoustic noise. However, in such a system, because a rack or cabinet may house a large number of HDDs, the acoustic noise measurement device may not accurately predict the acoustic noise level experienced by each of the HDDs. Further, because the acoustic noise may vary during operation of the storage system, such a system is not able to take mitigating actions in real-time (e.g., dynamically adjust the cooling system or control read/write operations of individual HDDs in response to changing levels of acoustic noise experienced by each of the HDDs). Still further, such a system is not able to coordinate throughput performance with cooling levels.

SUMMARY

HDDs and methods, according to implementations of this disclosure, that provide a microphone included within the HDDs and processing circuitry that processes signals from the microphones in real time, using the existing circuitry of the HDDs, to determine an acoustic noise level at each of the HDDs, are provided.

According to implementations of the subject matter of this disclosure, a hard disk drive (HDD) includes a disk, a write head configured to write data to the disk, a microphone, an HDD controller configured to process a signal from the microphone to determine noise detected by the microphone, and a housing that houses the disk, the write head, the microphone, and the HDD controller.

In a first implementation of such an HDD, the HDD controller may be further configured, when processing the signal from the microphone to determine noise detected by the microphone, to amplify the signal, convert the signal to a digital signal, and analyze the digital signal in one of a frequency domain and a time domain to determine the noise detected by the microphone.

According to a first aspect of the first implementation, the HDD controller may be further configured, when analyzing the digital signal in the frequency domain to convert the digital signal to the frequency domain by performing one of a wavelet transformation and a fast Fourier transformation on the digital signal.

In a second implementation of such an HDD, the HDD controller may be further configured, when processing the signal from the microphone, to determine noise detected by the microphone, to compare the determined noise with noise signatures associated with different noise sources to identify a source of the noise detected by the microphone.

In a third implementation of such an HDD, the HDD controller may be further configured to determine whether the noise detected by the microphone exceeds a threshold, determine whether a write operation of data to the disk is being performed, and in response to determining that the noise detected by the microphone exceeds the threshold during the write operation of data to the disk, perform a rewrite operation to rewrite the data to the disk.

In a fourth implementation of such an HDD, wherein the HDD controller may be a system-on-chip configured to control an overall functionality of the HDD.

According to a first aspect of the fourth implementation, the microphone may be integrated with the HDD controller.

In a fifth implementation of such an HDD, the microphone may be positioned adjacent to circuitry within the HDD that is most sensitive to acoustic noise.

In a sixth implementation of such an HDD, the microphone may be positioned adjacent to the write head.

In a seventh implementation of such an HDD, the microphone may be a first microphone, the noise may be a first noise, and the signal may be a first signal. The HDD may further include a second microphone positioned in a different area within the housing to the first microphone, and the HDD controller may be further configured to process a second signal from the second microphone to determine a second noise detected by the second microphone.

In an eighth implementation of such an HDD, the HDD may be a 2½ inch drive.

In a ninth implementation of such an HDD, the HDD may further include an interface configured to provide data. The interface may be one from among an SAS connector and an SATA connector, and the data may be the determined noise.

According to implementations of the subject matter of this disclosure, a system includes a plurality of HDDs, a cooling system, and a system controller. Each of the plurality of HDDs includes a disk, a write head configured to write data to the disk, a microphone, an HDD controller configured to process a signal from the microphone determine noise detected by the microphone, and a housing that houses the disk, the write head, the microphone, and the HDD controller. The cooling system is configured to cool the plurality of the HDDs. The system controller is configured to receive data corresponding to the determined noise detected by the microphones of each of the plurality of HDD, and control a cooling level of the cooling system based on the received data and acoustic noise information associated with each of the plurality of HDDs.

In a first implementation of such a system, the system controller may be further configured to control a throughput of each of the plurality of HDDs in association with the cooling level of the cooling system based on the received data and the acoustic noise information associated with each of the plurality of HDDs.

In a second implementation of such a system, for each of the plurality of HDDs, the HDD controller may be further configured to determine whether the noise detected by the microphone exceeds an acoustic noise threshold associated with the HDD, determine whether a write operation of data to the disk is being performed, and in response to determining that the noise detected by the microphone exceeds the acoustic noise threshold during the write operation of data to the disk, perform a rewrite operation to rewrite the data to the disk.

In a third implementation of such a system, for each of the plurality of HDDs, the HDD controller may be further configured to amplify the determined noise detected by the microphone, and transmit the amplified noise to the system controller through an interface comprising a SAS connector.

According to implementations of the subject matter of this disclosure, an HDD controller configured to control an overall functionality of an HDD, and process a signal from a microphone disposed within a housing of the HDD to determine noise detected by the microphone.

In a first implementation of such an HDD controller, the HDD controller may be a system-on-chip, and the microphone may be integrated with the HDD controller.

According to a first aspect of the first implementation, the HDD controller may further include an amplifier, and an analog to digital converter (ADC). The HDD controller may be further configured, when processing the signal from the microphone to determine noise detected by the microphone, to amplify, by the amplifier, the signal, convert, by the ADC, the signal to a digital signal, and analyze the digital signal in one of a frequency domain and a time domain to determine the noise detected by the microphone.

In a second implementation of such an HDD controller, the HDD controller may be further configured, when processing the signal from the microphone to determine noise detected by the microphone, to compare the determined noise with noise signatures associated with different noise sources to identify a source of the noise detected by the microphone.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, large-scale storage systems may include HDDs installed in a plurality of racks or cabinets and a cooling system configured to cool the HDDs. In order to avoid read/write errors produced by acoustic noise (e.g., generated by the cooling system) causing an offset between data tracks and a read/write head of read/write actuator arms of the HDDs, typical storage systems may determine the acoustic noise that HDDs are likely to be subject to during operation to ensure that the acoustic noise is below an acoustic noise threshold level for the HDDs. For example, an acoustic noise measurement device having the same form factor as an HDD (e.g., as described in U.S. Patent Publication No. 2019/0051323) may be used to collect acoustic noise data to generate a report to determine how physical features and/or control systems of the HDD may be modified to better accept and/or withstand acoustic noise.

Implementations of the subject matter of this disclosure allow the acoustic noise level at each HDD in a storage system to be individually monitored in real-time, using a microphone installed in each HDD and the existing circuitry of the HDDs. Using this real time data, the throughput of the storage system may be maximized (e.g., by real-time correlation between the throughput of individual HDDs and operation of a cooling system), while taking any required mitigating actions to avoid read/write errors. For example, to adjust the level of acoustic noise that is produced by a cooling system (e.g., that may cause errors in the read/write operations of certain HDDs), a data center host may dynamically adjust a cooling level of the cooling system and control read/write operation (or re-read/rewrite operations) in real-time based on the monitored acoustic noise levels (e.g., performance aware thermal fan scheduling)

Implementations of the subject matter of this disclosure may be illustrated with reference to FIGS. 1-6.

Figure 1:
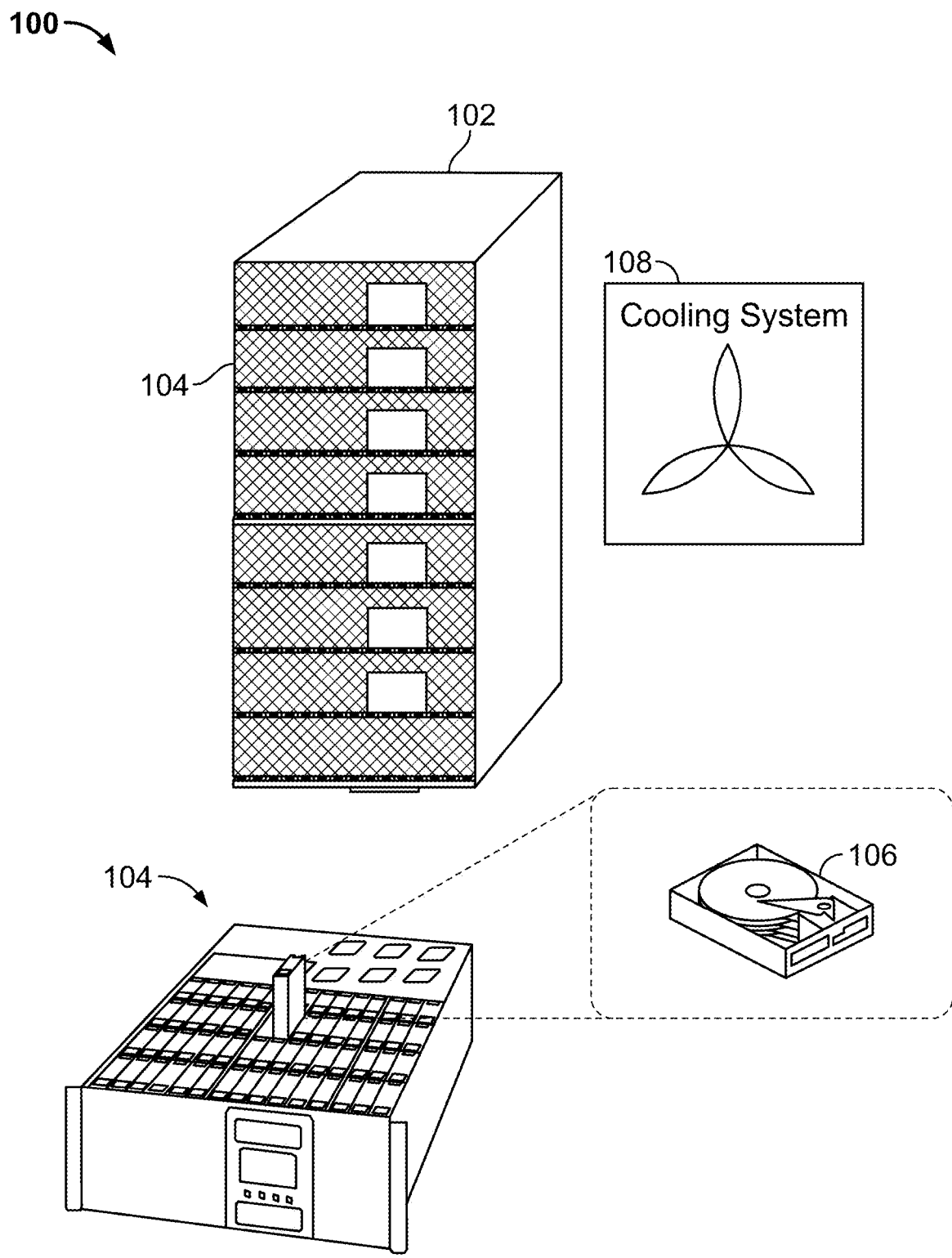
FIG. 1 illustrates a storage system, in accordance with implementations of the subject matter of this disclosure.

FIG. 1 illustrates a storage system 100, in accordance with some implementations of the subject matter of this disclosure. The storage system 100 is an example of a storage system that may be found in a large-scale system (e.g., a data center). As shown, the storage system 100 includes a rack 102 including a plurality of drawers 104. Each of the drawers 104 may include a plurality of HDDs 106. However, this is only one example, and the HDDs 106 may be installed in any rack or cabinet. A data center may include tens or hundreds of the racks 102.

The storage system 100 may further include a cooling system 108. The cooling system 108 may employ air cooling and/or liquid cooling to cool the plurality of HDDs 106. For example, the cooling system 108 may include one or more fans within each of the drawers 104 to move cool air to cool the HDDs 106. In some implementations, the cooling system 108 may pump a cooling fluid through pipes in the vicinity of the rack 102. The cooling system 108 may produce acoustic noise that affects the operation of the HDDs 106. The acoustic noise may be expected or unexpected. For example, it may be determined that running fans above a certain RPM or pumping cooling fluid through pipes above a certain rate may produce noise that negatively affects the operation of the HDDs 106 (e.g., exceeds an acoustic noise threshold of the HDDs 106). In other examples, unexpected sources of acoustic noise (e.g., a bent fan blade, accumulated dust in a cooling fan, etc.) may cause the cooling system 108 to produce acoustic noise that affect operation of some or all of the HDDs 106. However, due to the different placement of each of the HDDs 106 and, e.g., the different sensitivities of different types of HDDs 106, noise generated by the cooling system 108 may adversely affect only some of the HDDs 106. By monitoring noise at each of the HDDs 106 in real-time, the throughput performance of the storage system 100 may be maximized, by controlling the cooling system 108 (e.g., cooling level) and the individual operation of the HDDs 106, as explained in greater detail below.

Figure 2:
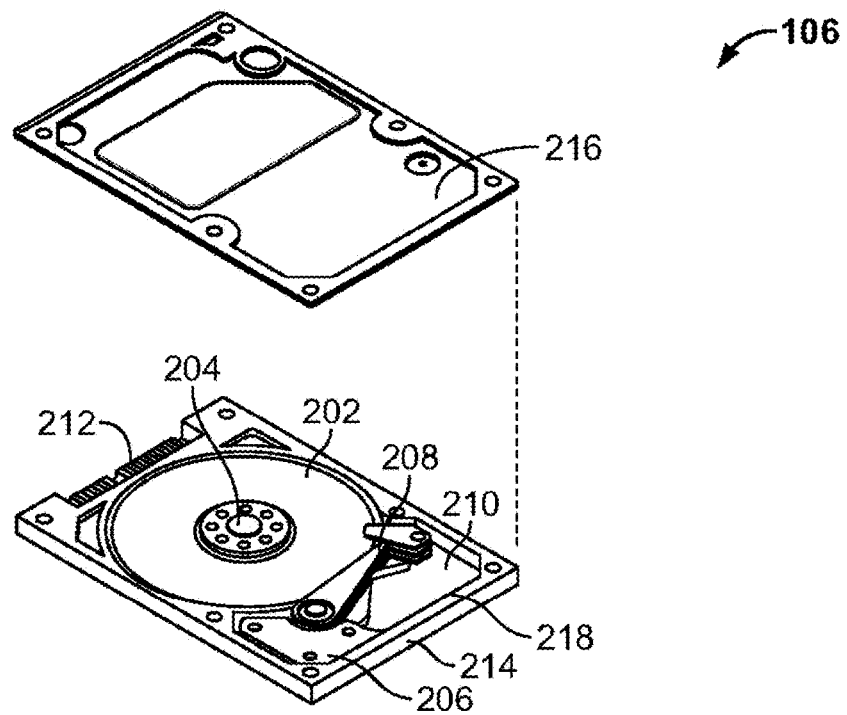
FIG. 2 illustrates an example HDD, in accordance with implementations of the subject matter of this disclosure.

FIG. 2 illustrates an example HDD 106 (e.g., as shown in FIG. 1), in accordance with implementations of the subject matter of this disclosure. As shown, the HDD 106 includes a plurality of magnetic platters 202 connected to a spindle 204 configured to turn the magnetic platters 202. The HDD 106 further includes an actuator 206 configured to move one or more actuator arms 208 relative to the plurality of magnetic platters 202. The one or more actuator arms 208 include read/write heads to read and/or write data to or from the plurality of magnetic platters 202. The HDD 106 further includes an HDD system-on-chip (SOC) 210 (e.g., an HDD controller) configured to control the operation of the HDD 106. The HDD 106 includes an input/output (I/O) interface 212 for communicating with a host (e.g., a data center host). The I/O interface 212 may be a serial attached SCSI (SAS) interface, a serial ATA (SATA) interface, or any other suitable interface. The HDD 106 may include a housing comprising a frame 214 and a cover 216.

The HDD 106 may further include a microphone 218 disposed within the housing of the HDD 106. As exampled in further detail below, the HDD SOC 210 may process signals from the microphone to determine acoustic noise detected by the microphone 218. In some implementations, the microphone 218 may be included with the HDD SOC 210. However, this is only one example, and the microphone 218 may also be disposed adjacent to a location within the HDD 106 that is most sensitive to acoustic noise (e.g., adjacent to the one or more actuator arms 208), which may improve acoustic noise measurements in the HDD 106. In some implementations, the HDD 106 may include more than one microphone 218 disposed within the housing of the HDD 106.

Figure 3:
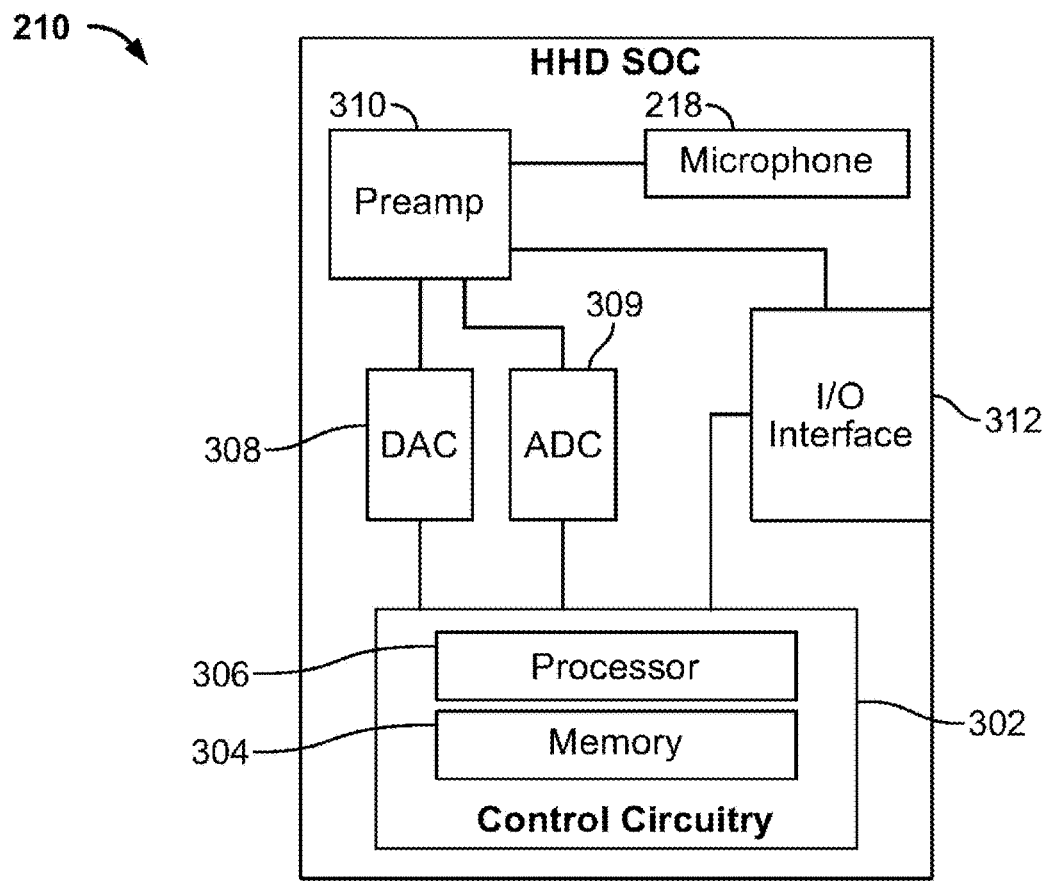
FIG. 3 illustrates a partial block diagram of an HDD system-on-chip (SOC), in accordance with implementations of the subject matter of this disclosure.

FIG. 3 illustrates a partial block diagram of the HDD SOC 210, in accordance with implementations of the subject matter of this disclosure. The HDD SOC 210 (e.g., HDD controller) may control the operation of the HDD 106. As shown, the HDD SOC 210 includes control circuitry 302 comprising a memory 304 and a processor 306 (e.g., an SOC core) configured to control the operation of the HDD 106. The HDD SOC 210 further includes a digital-to-analog (DAC) converter 308 configured to convert digital data to analog signals for storage on the HDD 106 and an analog-to-digital (ADC) converter 309 configured to convert analog signal read from the HDD 106 to digital signals. The HDD SOC 210 further includes a preamp 310 configured to amplify read/write signals. The HDD SOC 210 further includes an I/O interface 312 for providing communication resources within the HDD 106. The HDD SOC 210 may further include a variety of other digital and/or analog circuitry for controlling operation of the HDD 106, as understood by those skilled in the art.

In some implementations, as discussed above, the microphone 218 may be included with the HDD SOC 210. However, this is only one example, and the microphone 218 may also be connected to the HDD SOC 210 through the I/O interface 312. The existing circuitry of the HDD SOC 210 may be further configured to process signals detected by the microphone 218 (e.g., acoustic noise). For example, the preamp 310 may be configured to amply signals detected by the microphone 218 (e.g., corresponding to acoustic noise), and the ADC 309 may convert these amplified analog signals to digital signals to be processed the control circuitry 302 and transmitted to, e.g., a data center controller through the existing connections in the data center, as explained in further detail below. By configuring the existing circuitry of an HDD SOC (e.g., HDD SOC 210) to process signals detected by a microphone, the system described herein may be implemented simply by adding a microphone to an HDD and configuring the circuitry of the HDD to process the signals detected by the microphone. In addition to reducing cost and complexity (e.g., compared to a separate system for estimating the acoustic noise levels that an HDD will experience, such as the system described in U.S. Patent Publication No. 2019/0051323), the system described herein may detect in real-time, at each HDD in a data storage system, the acoustic noise experienced by each HDD, and take any necessary mitigating actions in real-time (e.g., dynamically adjust the cooling system or control read/write operations of individual HDDs in response to changing levels of acoustic noise experienced by each of the HDDs). For example, when read/write operations are not being performed (or are being performed at a low throughput level), the system may operate the cooling system at a high cooling level (e.g., that could otherwise cause errors in the read/write operations). When read/write operations are being performed (e.g., especially at a high throughput level), the system may operate the cooling system at a lower cooling level (e.g., that is not likely to cause any errors in the read/write operation). When an HDD is approaching a maximum operating temperature (e.g., due to a high throughput level) the system may lower the throughput level and increase the cooling level. That is, the system may coordinate, in real-time, the cooling level and the throughput of individual HDDs.

Figure 4:
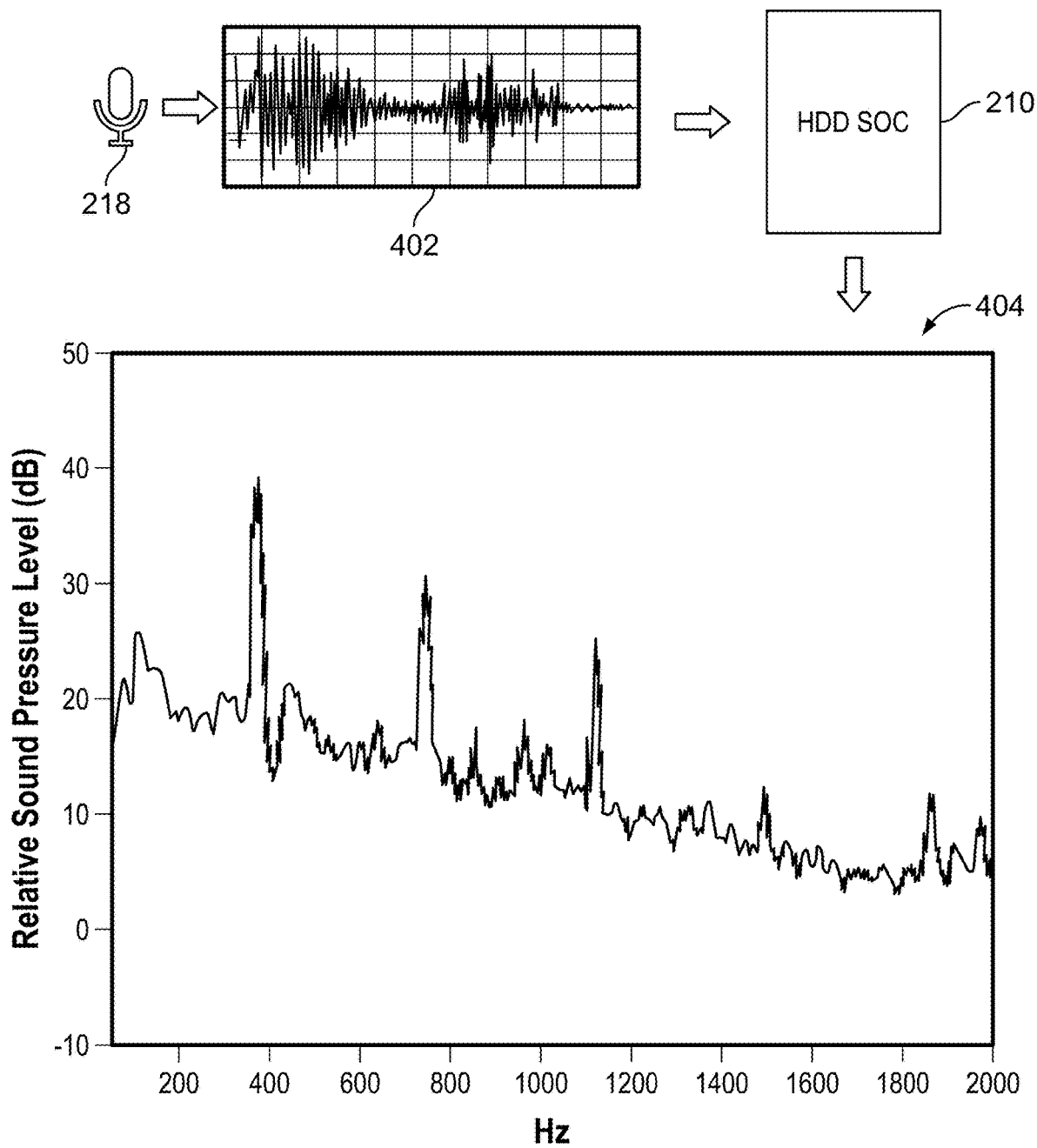
FIG. 4 illustrates example waveforms corresponding to acoustic noise detected by a microphone of an HDD, in accordance with implementations of the subject matter of this disclosure.

FIG. 4 illustrates example waveforms corresponding to acoustic noise detected by a microphone of an HDD, in accordance with implementations of the subject matter of this disclosure. As shown, the microphone 218 may generate a first waveform 402 corresponding to acoustic noise detected by the microphone 218. The HDD SOC 210 may process the first waveform 402 to generate a second waveform 404. For example, the HDD SOC 210 may amplify, convert (e.g., from an analog to a digital signal), and transform the first waveform 402 in the time domain into second waveform 404 in the frequency domain (e.g., using a Fourier transform (FT), Fast Fourier transform (FFT), Wavelet transform (WT), etc.). However, this is only an example, and the HDD SOC 210 may use any suitable processing and algorithms to analyze the acoustic noise detected by the microphone 218.

As shown, the second waveform 404 may include a plurality of spikes (e.g., at 350 Hz, 700 Hz, 1100 Hz, etc.). In some implementations, the HDD SOC 210 may analyze the second waveform 404 to determine the source of the detected acoustic noise. For example, the HDD SOC 210 may compare the second waveform 404 with noise signatures associated with different noise sources to identify the source of the noise detected by the microphone. For example, 350 Hz may be associated with a cooling pump, 700 Hz may be associated with an air conditioner, and 1100 Hz may be associated with a cooling fan. However, this is only one example, and the HDD SOC 210 may determine noise signatures of the second waveform 404 in any suitable manner. In some implementations, the HDD SOC 210 may determine if the second waveform 404 exceeds one or more threshold levels associated with the HDD. The threshold levels may correspond to the acoustic specification of the HDD, including the microphone 218 (e.g., the maximum amount of acoustic noise the HDD is able to be subject to and operate without error). Different HDDs may have different threshold levels. In some implementations, the HDD SOC 210 may determine if portions of the second waveform 404 exceed certain threshold levels associated with normal operation of the cooling system of the storage system (e.g., the cooling system 108). Although the HDD SOC 210 is described as determining if detected acoustic noise levels exceed one or more threshold levels, it should be understood that processing circuitry of a data center host may perform certain processing related to the acoustic noise determination, as described in further detail below.

Figure 5:
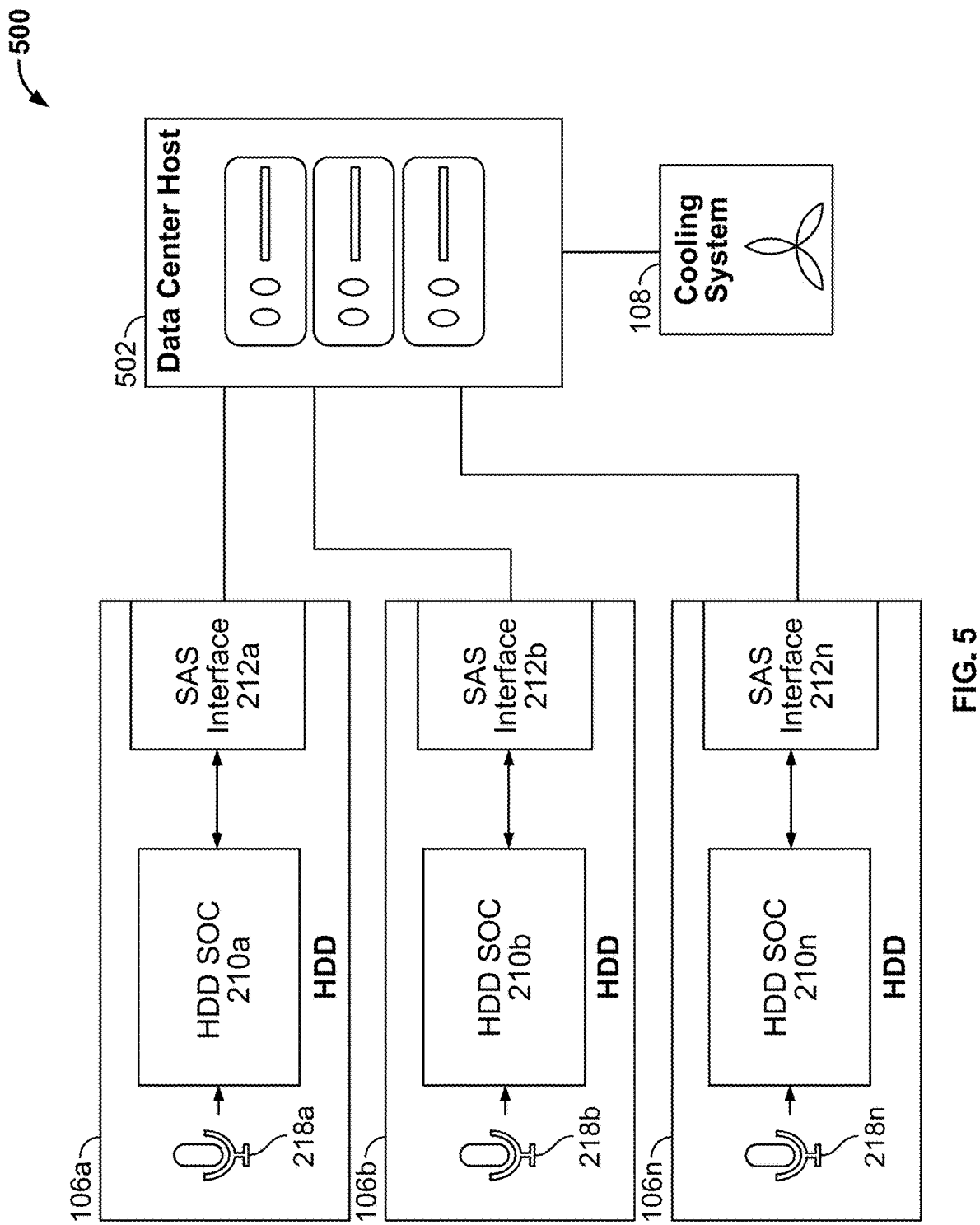
FIG. 5 illustrates a data center, in accordance with implementations of the subject matter of this disclosure.

FIG. 5 illustrates a data center 500, in accordance with some implementations of the subject matter of this disclosure. As shown, the data center 500 (e.g., a storage system) includes a plurality of HDDs 106a, 106b, . . . 106n connected to a data center host 502. Although only three HDDs are shown, it should be understood that a data center may include any number of HDDs. The plurality of HDDs 106a, 106b, . . . 106n may be installed on a plurality of racks (e.g., the racks 102 of FIG. 1) and may be cooled by the cooling system 108, as described above. As shown, each of the plurality of HDDs 106a, 106b, 106n may include a corresponding microphone 218a, 218b, . . . 218n, HDD SOC 210a, 210b, . . . 210n, and an SAS interface 212a, 212b, . . . 212n. Each of the plurality of HDDs 106a, 106b, . . . 106n may be connected to the data center host 502 through the SAS interfaces 212a, 212b, . . . 212n. The data center host 502 may transmit read/write requests to each of the plurality of HDDs 106a, 106b, . . . 106n. Additionally, the data center host 502 may control the cooling system 108. Based on noise information received from each of the plurality of HDDs 106a, 106b, . . . 106n, the data center host 502 may control the cooling system 108 and read/write operations (e.g., in association with the respective HDD SOCs 210a, 210b, . . . 210n). For example, the data center host 502 may optimize throughput of the plurality of HDDs 106a, 106b, . . . 106n by optimizing cooling levels of the cooling system 108 and read/write operations of the plurality of HDDs 106a, 106b, . . . 106n in real-time, based on the detected acoustic noise and acoustic noise specification of each of the plurality of HDDs 106a, 106b, . . . 106n. Additionally, the data center host 502 may identify problems with the cooling system 108 based on the detected acoustic noise. In some implementations, as discussed above, the data center host 502 may process data received from each of the plurality of HDDs 106a, 106b, . . . 106n to determine the detected acoustic noise levels. In some implementations, a single HDD SOC may process signals from a plurality of microphones (e.g., from other ones of the plurality of 106a, 106b, 106n).

Figure 6:
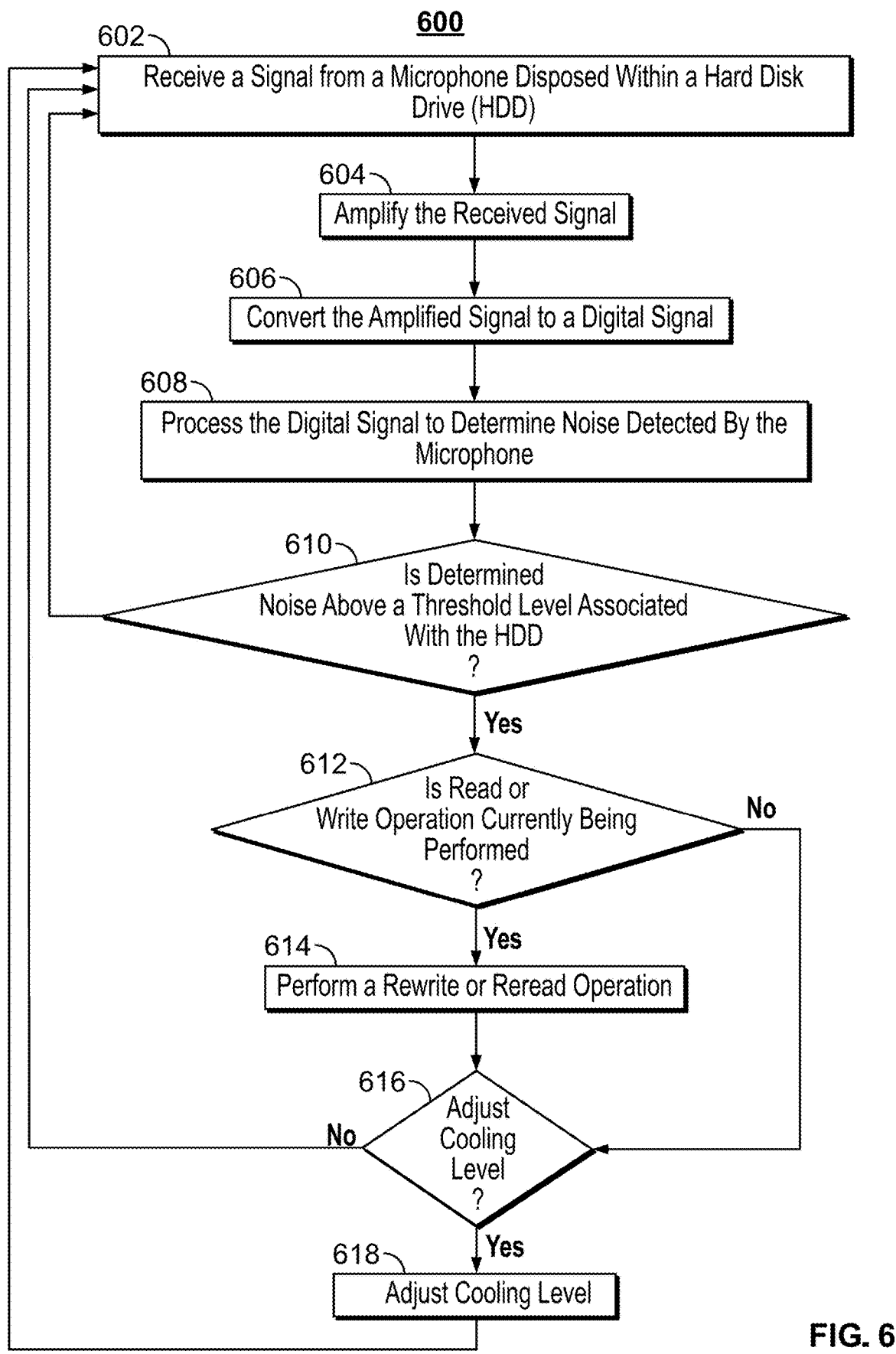
FIG. 6 depicts a flowchart of illustrative steps of a process for mitigating the effects of acoustic noise detected at an HDD of a storage system, implementations of the subject matter of this disclosure.

FIG. 6 depicts a flowchart of illustrative steps of a process 600 for mitigating the effects of acoustic noise detected at an HDD of a storage system, in accordance with implementations of the subject matter of this disclosure. The process begins at 602 when an HDD SOC (e.g., the HDD SOC 210) receives a signal from a microphone disposed within an HDD (e.g., the HDD 106). The signal may be generated by the microphone in response to acoustic noise detected by the microphone. The acoustic noise may be generated by a cooling system of the HDD (e.g., the cooling system 108).

At 604, the HDD SOC amplifies the received signal. For example, the HDD SOC may utilize a preamp (e.g., the preamp 310) to amplify the signal.

At 606, the HDD SOC converts the amplified signal to a digital signal. For example, the HDD SOC may utilize an ADC (e.g., the ADC 309) to convert the amplified signal.

At 608, the HDD SOC may process the digital signal to determine noise detected by the microphone. In one example, the HDD SOC may convert the digital signal into the frequency domain (e.g., using an FFT) and analyze the converted signal in the frequency domain. In some implementations, the HDD SOC may transmit the digital signal directly to a data center host (e.g., the data center host 502) for processing.

At 610, the HDD SOC (or the data center host) may determine if the determined noise is above a threshold level associated with the HDD. For example, the HDD SOC may determine if the determined noise level exceeds an acoustic noise threshold level associated with the HDD. In response to determining that the determined noise is not above the threshold level ("No" at 610), the process 600 returns to 602 and continues to monitor acoustic noise levels. Otherwise ("Yes" at 610), the process 600 proceeds to 612. In some implementations, the HDD SOC may communicate, in real-time, the determined noise level to the data center host. Based on the determined noise level, the data center host may coordinate, in real-time, the throughput of the HDD and the cooling level provided to the HDD.

At 612, the HDD SOC (or the data center host) determines if a read or write operation is currently being performed. In response to determining that a read or write operation is not currently being performed ("No" at 612), the process 600 proceeds to 616. Otherwise ("Yes" at 612), the process 600 proceeds to 614.

At 614, the HDD SOC (or the data center host), in response to determining that a read or write operation is currently being performed (when the determined noise is above the threshold level), performs a rewrite or a re-read operation. For example, when data is read from or written to an HDD while the HDD is subject to acoustic noise above a threshold level associated with normal operation of the HDD, the data may be corrected. Thus, by performing a rewrite or a re-read operation when acoustic noise exceeds a threshold level, reading/writing errors of the HDD may be reduced.

At 616, the data center host may determine whether to adjust a cooling level of a cooling system of the HDD (e.g., the cooling system 108). For example, the data center host may determine if the detected acoustic noise is caused by the cooling system operating above a certain cooling level. If the data center host determines if the detected acoustic noise is caused by the cooling system operating above a certain cooling level ("Yes" at 616), the process 600 proceeds to 618. Otherwise ("No" at 616), the process 600 returns to 602 and continues to monitor acoustic noise levels.

At 618, the data center host adjusts the cooling level of the cooling system. For example, the data center host may adjust an overall cooling level of the cooling system (e.g., coolant flow or air conditioning level) or a local cooling level of the cooling system (e.g., a cooling fan adjacent to the HDD). That is, the operation of the cooling system may be coordinated with the operation of the HDD (e.g., including the current operating temperature of the HDD, which may also be communicated to the data center host).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. Additionally, although the process 600 is only described for a single HDD, it should be understood that the process 600 may be performed for a storage system (e.g., a data center) having any number of HDDs. In this case, the data host controller may receive information about each of the HDDs (e.g., acoustic sensitivity of the HDDs) as well as data corresponding to the acoustic noise detected at each of the HDDs. As HDDs may be individually upgraded and replaced in the storage system, HDDs within the same or different racks may have different acoustic noise sensitivities. Thus, controlling the operation of the storage system based on receiving information from each of the HDDS, the throughput of the storage system may be maximized, while reducing read/write errors. For example, by determining the current acoustic noise level experienced by an HDD, the throughput of the HDD may be coordinated with the cooling provided to the HDD (e.g., based on the current operating temperature of the HDD), such that the throughput of the HDD may be maximized without overheating the HDD or introducing read/write errors caused by excessive acoustic noise. Additionally, by analyzing acoustic noise information in real-time, problems in the cooling system may be quickly identified.

As used herein and in the claims which follow, the construction "one of A and B" shall mean "A or B."

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. A system controller configured to:
   receive data corresponding to determined noise detected by a plurality of microphones, each respective microphone being positioned within a respective hard disk drive (HDD) in a plurality of HDDs; and
   control a cooling level of a cooling system configured to cool the plurality of HDDs based on the received data and acoustic noise information associated with each respective HDD in the plurality of HDDs.

2. The system controller of claim 1, wherein the system controller is further configured to control a throughput of each respective HDD in the plurality of HDDs in association with the cooling level of the cooling system based on the received data and the acoustic noise information associated with each respective HDD in the plurality of HDDs.

3. The system controller of claim 1, wherein the system controller is further configured to receive data through an interface comprising an SAS connector.

4. The system controller of claim 1, wherein the system controller is further configured to, based on the received data and acoustic noise information, identify a problem with the cooling system.

5. The system controller of claim 1, wherein the system controller is configured to control the cooling level of the cooling system configured to cool the plurality of HDDs based on the received data and acoustic noise information associated with each respective HDD in the plurality of HDDs by comparing the determined noise with noise signatures associated with different noise sources to identify a source of the noise detected by the respective microphone.

6. The system controller of claim 1, wherein the system controller is further configured to:
   determine whether the noise detected by a respective one of the microphones in the plurality of microphones exceeds an acoustic noise threshold associated with a respective HDD corresponding to the respective one of the microphones;
   determine whether a write operation writing data to the respective HDD is being performed; and
   in response to determining that the noise detected by the respective microphone during the write operation writing data to the respective HDD exceeds the acoustic noise threshold associated with the respective HDD, instruct the respective HDD to perform a rewrite operation to rewrite the data to the respective HDD.

7. A system comprising:
   a plurality of respective hard disk drives (HDDs), each respective HDD among the plurality of HDDs comprising:
   a respective disk;
   a respective write head configured to write data to the respective disk;
   a respective microphone;
   a respective HDD controller configured to process a signal from the respective microphone and to determine noise detected by the respective microphone; and
   a respective housing that houses the respective disk, the respective write head, the respective microphone, and the respective HDD controller;
   a cooling system configured to cool the plurality of the HDDs; and
   a system controller configured to:
   receive data corresponding to the determined noise detected by the respective microphones of respective ones of HDDs among the plurality of HDDs; and
   control a cooling level of the cooling system based on the received data and acoustic noise information associated with each respective one of the plurality of HDDs.

8. The system of claim 7, wherein the system controller is further configured to control a throughput of each respective one of the plurality of HDDs in association with the cooling level of the cooling system based on the received data and the acoustic noise information associated with each respective one of the plurality of HDDs.

9. The system of claim 7, wherein for each respective one of the plurality of HDDs, the respective HDD controller is further configured to:
- determine whether the noise detected by the respective microphone exceeds a respective acoustic noise threshold associated with the respective HDD;
- determine whether a write operation of data to the respective disk is being performed; and
- in response to determining that the noise detected by the respective microphone exceeds the respective acoustic noise threshold during the write operation of data to the respective disk, perform a rewrite operation to rewrite the data to the respective disk.

10. The system of claim 7, wherein for each respective one of the plurality of HDDs, the respective HDD controller is further configured to:
- amplify the determined noise detected by the respective microphone; and
- transmit the amplified noise to the system controller through an interface comprising a SAS connector.

11. The system of claim 7, wherein each respective HDD controller is further configured to, when processing the signal from the microphone to determine noise detected by the microphone:
- amplify the signal;
- convert the signal to a digital signal; and
- analyze the digital signal in one of a frequency domain and a time domain to determine the noise detected by the respective microphone.

12. The system of claim 11, wherein each respective HDD controller is further configured to, when analyzing the digital signal in the frequency domain, convert the digital signal to the frequency domain by performing one of a wavelet transformation and a fast Fourier transformation on the digital signal.

13. The system of claim 7, wherein each respective HDD controller is further configured to, when processing the signal from the respective microphone to determine noise detected by the respective microphone, compare the determined noise with noise signatures associated with different noise sources to identify a source of the noise detected by the respective microphone.

14. The system of claim 7, wherein the respective HDD controller is a respective system-on-chip configured to control an overall functionality of the respective HDD.

15. The system of claim 13, wherein each respective microphone is integrated with each respective HDD controller.

16. The system of claim 7, wherein each respective microphone is positioned adjacent to circuitry within each respective HDD that is most sensitive to acoustic noise.

17. The system of claim 7, wherein each respective microphone is positioned adjacent to each respective write head.

18. The system of claim 7, wherein:
- each respective microphone is a respective first microphone, each noise is a respective first noise, and each signal is a respective first signal;
- each respective HDD further comprises a respective second microphone positioned in a different area within the housing relative to the respective first microphone; and
- each HDD controller is further configured to process a second signal from the respective second microphone to determine a second noise detected by the respective second microphone.

19. The system of claim 7, wherein each respective HDD is a 2½ inch drive.

20. The system of claim 7, further comprising an interface configured to provide data, wherein:
- the interface is one from among an SAS connector and a SATA connector, and
- the data is the determined noise.

* * * * *